W. M. JEWELL. 2 Sheets—Sheet 1.

Assignor to S. H. TEMPLETON & J. A. MCANAULTY.

FEED MECHANISM FOR ROLLER MILLS.

No. 10,979. Reissued Jan. 8, 1889.

ATTEST

S. H. Hopkins

Harry L. Simes.

INVENTOR

William M. Jewell

By J. A. McAnaulty.

Atty.

W. M. JEWELL. 2 Sheets—Sheet 2.

Assignor to S. H. TEMPLETON & J. A. MCANAULTY.

FEED MECHANISM FOR ROLLER MILLS.

No. 10,979. Reissued Jan. 8, 1889.

ATTEST

F. A. Hopkins.

Harry L. Amer.

INVENTOR

William M. Jewell.

By J. A. McAnulty

Atty

UNITED STATES PATENT OFFICE.

WILLIAM M. JEWELL, OF PINE, COLORADO, ASSIGNOR TO SAMUEL H. TEMPLETON, OF SCRANTON, IOWA, AND J. A. McANULTY, OF DENVER, COLORADO.

FEED MECHANISM FOR ROLLER-MILLS.

SPECIFICATION forming part of Reissued Letters Patent No. 10,979, dated January 8, 1889.

Original No. 280,184, dated June 26, 1883. Application for reissue filed June 13, 1885. Serial No. 168,559.

*To all whom it may concern:*

Be it known that I, WILLIAM M. JEWELL, a citizen of the United States, residing at Pine, in the county of Jefferson and State of Colorado, formerly a resident of Denver, Colorado, have invented certain new and useful Improvements in Feed Mechanisms for Roller-Mills; and I do hereby declare the following to be a full, clear, and exact description of the invention, that will enable others skilled in the art to which it appertains to make and use the same, reference being had to the accompanying drawings, and to the letters of reference marked thereon, which form a part of this specification.

This invention has for its object the assurance of a steady and even feed and distribution of grain or middlings to the rollers of that class of grain-reduction mills of which the Gray patents are examples; and the invention consists, to this end, in the construction, combination, and arrangement of parts, as hereinafter specified and claimed.

Figure 1:
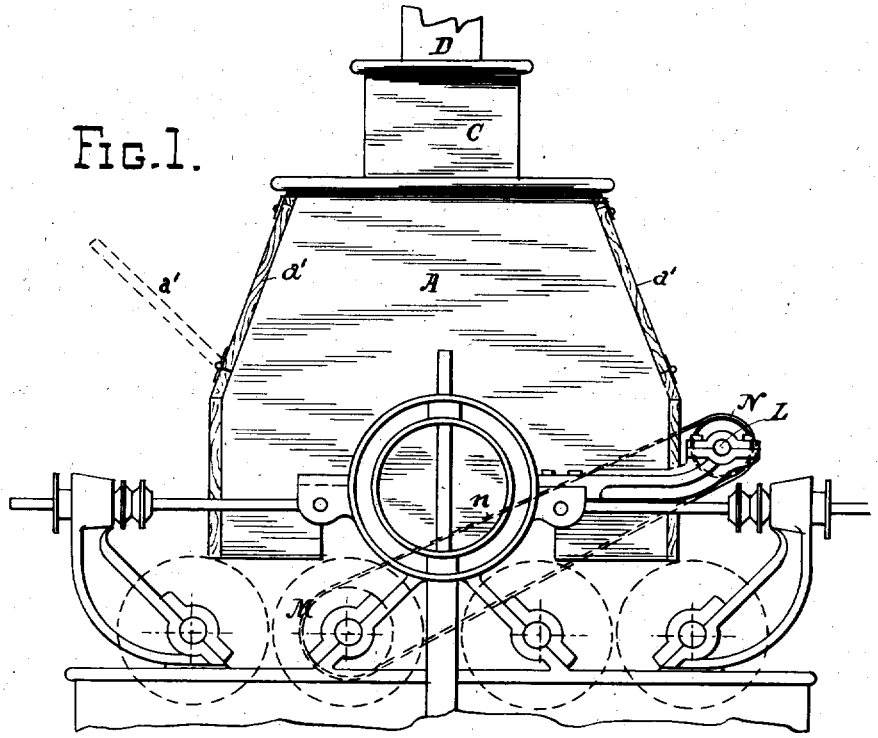
Figure 2:
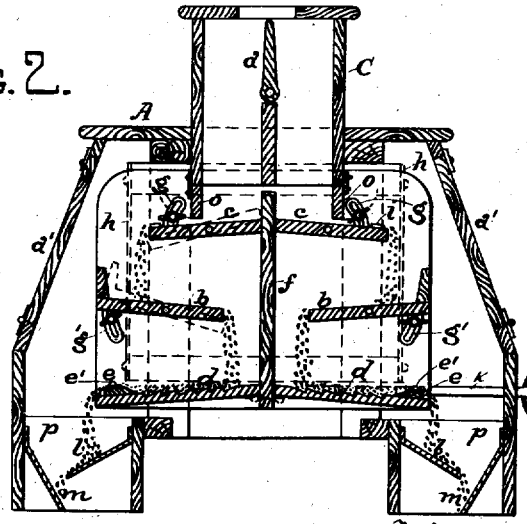
Figure 3:
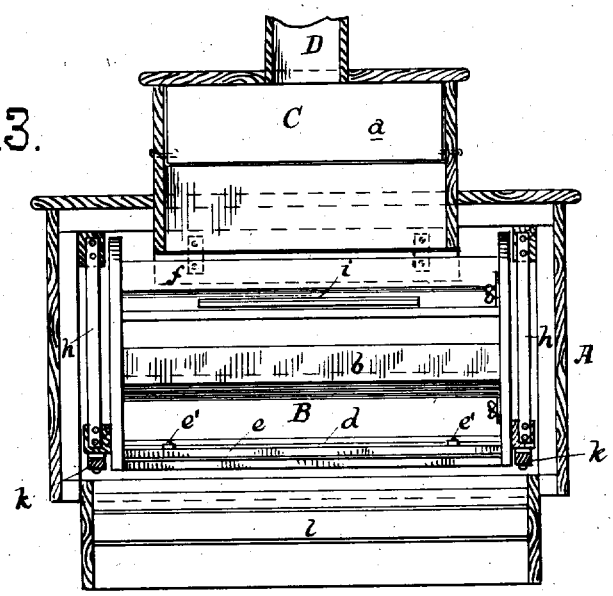
Figure 4:
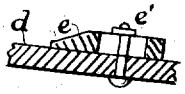

In the accompanying drawings, in the several figures of which like parts are similarly designated, Figure 1 is a side elevation of my feed applied to a Gray roller-mill, the rollers being indicated by dotted lines. Fig. 2 is a transverse section of the feed from left to right of Fig. 1. Fig. 3 is a longitudinal section of the feed; and Fig. 4 is a sectional detail, enlarged, of the adjustable riffle.

A is the feed-case, and B the vibrating or shaking frame suspended therein upon straps *h h* of spring-steel.

C is the hopper, which for a double machine has a central partition with a movable gate, *a*, to divide the incoming grain or middlings into two streams, and which gate may be thrown across one or the other of the mouths of the two compartments of the hopper to divert the grain or middlings to but a single pair of rollers, as may be desired, the normal position of this valve for a double machine using both pairs of rollers being indicated in Fig. 2.

D is the feed-spout.

The discharge end of the hopper is provided with movable gates *o* to aid in directing and governing the discharge, and beneath the hopper and in line with its partition is a vertical partition, *f*, in the shaker, lengthwise thereof. Pivoted lengthwise of the shaker and normally at opposite inclines from the bottom of the hopper are shelves or chutes *c c*, their inclination being variable by thumb-nuts on bolts and slotted segments *g g*, through which said bolts extend, the variation in the inclination being governed by the condition of the grain. These shelves have at their outer ends, longitudinally thereof, ridges or ribs *i* to prevent centering of the grain thereon. The grain falls from shelves *c c* on shelves *b b*, beneath said shelves *b b* being pivoted also and inclined, but in a reverse direction with relation to the shelves *c c*, and said shelves *b b* are similarly adjustable with bolts, thumb-nuts, and slotted segments *g′ g′*. At the bottom of the shaker are placed the inclined riffles *d d*, the same being plates or boards having serrated surfaces.

Adjustable riffles *e* are arranged at the outer ends of the riffle-boards *d d*. The adjustability of these riffles is secured by bolts *e′* passing from the riffle-board up through slots in the riffles and provided with suitable retaining or cramping nuts and washers or like devices bearing upon the upper faces of the said riffles. The boards *d d* are inclined toward discharge-spouts *p p*. These spouts *p p* are provided with equalizing-shelves *l m*, inclined at different angles from opposite walls of the spouts. The spouts *p p* open over the meeting faces of the subjacent pairs of reduction-rolls.

L is a shaft suitably supported upon the frame and banded by belt *n* over pulley N to the shaft of one of the fast rollers M, and this shaft L is eccentrically connected by a pitman or link, *k*, with shaker B, so as to impart thereto a shaking or vibratory motion, and thereby positively cause the descent of the grain or middlings from one shelf to another through the series *c b d l m* to the rollers. The riffle-shelves *d d* insure the breaking up of lumpy middlings.

Doors *a′ a′* are provided in the feeder to gain access thereinto.

From the above description of my invention its operation is obvious and the advantage apparent.

What I claim is—

1. The combination, with the rollers of a roller-mill, of the vibrating inclined riffle-board *d*, having a corrugated or serrated upper surface, and an end riffle, *e*, which is adjustable back and forth, and the spout *p*, having the oppositely-inclined overlapping equalizing-shelves *l* and *m*, projecting from its opposite sides or walls, substantially as described.

2. The combination, with the casing A and the hopper C, of the frame B, suspended within said casing and provided with a series of oppositely-inclined adjustable distributing-shelves, the eccentric-shaft L, and the rod or pitman *k*, for imparting vibratory or shaking motion to said frame, and the rollers of a roller-mill, substantially as described.

3. The combination of the casing, the hopper, the frame suspended beneath said hopper and provided with a series of oppositely-inclined adjustable distributing-shelves, the upper shelf of the series having an anti-centering ridge or rib at its outer end, the eccentric-shaft and the rod or pitman for vibrating said frame, and the rollers of a roller-mill, substantially as described.

4. The combination of the grain-reducing rollers, the hopper, the frame suspended between said rollers and hopper, means to shake or vibrate said frame, and the inclined riffle-boards *d*, provided with the adjustable end riffles, *e*, substantially as described.

5. The combination, with the casing A and the hopper C, of the vibrating frame B, provided with two oppositely-inclined distributing-shelves, *c* and *b*, and the spout *p*, having the oppositely-inclined overlapping equalizing-shelves *l* and *m*, which project from its sides or walls, substantially as described.

6. The combination, with the rollers of a roller-mill, of two oppositely-inclined shaking distributing-shelves, *c* and *b*, the outwardly and downwardly inclined riffle-board *d*, having a corrugated or serrated upper surface, and the spout *p*, having the oppositely-inclined overlapping stationary equalizing-shelves *l* and *m* projecting from its sides or walls, substantially as described.

7. The combination of the hopper C, the casing A, the vibrating frame B, suspended therein and provided with the downwardly and outwardly inclined adjustable shelf *c*, with the downwardly and inwardly inclined adjustable shelf *b*, and with the downwardly and outwardly inclined riffle-board *d*, having a serrated upper surface, and the spout *p*, having the stationary oppositely-inclined overlapping equalizing-shelves *l* and *m*, substantially as described.

8. The combination of a casing, a hopper having a swinging gate at the lower edge of its front wall, two oppositely-inclined vibrating distributing-shelves, an outwardly and downwardly inclined riffle-board having a corrugated or serrated upper surface, and an adjustable riffle at its outer end, substantially as described.

9. The combination, with a casing and a hopper, of an outwardly-inclined vibrating distributing-shelf arranged closely to said hopper and provided at its outer end with an anti-centering ridge or rib, an inwardly-inclined vibrating distributing-shelf, a riffle-board having a serrated upper surface, and devices for adjusting the plane of said shelves, substantially as described.

10. The combination, with the casing A and the hopper C, of the vibrating frame B, suspended beneath said hopper and provided with an outwardly-inclined shelf, *c*, having a ridge or rib, *i*, with an inwardly-inclined shelf, *b*, and with an outwardly-inclined riffle-board, *d*, having a serrated upper surface and an adjustable end riffle, *e*, and means for vibrating said frame, substantially as described.

11. The combination of a casing, A, a hopper, C, a vibrating frame, B, suspended beneath said hopper and provided with an adjustable outwardly-inclined shelf, *c*, having a ridge or rib, *i*, at its outer end, with an adjustable inwardly-inclined shelf, *b*, and with an outwardly-inclined riffle-board, *d*, having a serrated upper surface and an adjustable end riffle, *e*, and means for vibrating said frame, substantially as described.

In testimony whereof I affix my signature in presence of two witnesses.

WILLIAM M. JEWELL.

Witnesses:
W. R. McDERMOTT,
J. B. WILLSEA.